(12) United States Patent
Metz

(10) Patent No.: US 7,697,743 B2
(45) Date of Patent: Apr. 13, 2010

(54) METHODS AND SYSTEMS FOR PRESCRIBING PARAMETERS FOR TOMOSYNTHESIS

(75) Inventor: Stephen Wayne Metz, Greenfield, WI (US)

(73) Assignee: General Electric Company, Schenectady, NY (US)

( * ) Notice: Subject to any disclaimer, the term of this patent is extended or adjusted under 35 U.S.C. 154(b) by 387 days.

(21) Appl. No.: 11/500,680

(22) Filed: Aug. 8, 2006

(65) Prior Publication Data

US 2006/0269114 A1 Nov. 30, 2006

Related U.S. Application Data

(63) Continuation-in-part of application No. 10/613,591, filed on Jul. 3, 2003, now Pat. No. 7,433,507.

(51) Int. Cl.
*G06K 9/00* (2006.01)
(52) U.S. Cl. ...................... 382/131; 382/132
(58) Field of Classification Search .......... 382/128–132
See application file for complete search history.

(56) References Cited

U.S. PATENT DOCUMENTS 6,751,285 B2 * 6/2004 Eberhard et al. .............. 378/37

* cited by examiner

*Primary Examiner*—Wesley Tucker
(74) *Attorney, Agent, or Firm*—McAndrews, Held & Malloy, Ltd.; Peter J. Vogel; Michael A. Dellapenna

(57) ABSTRACT

Certain embodiments of the present invention provide a method for performing tomosynthesis including: receiving an image representative of an anatomy of a patient; allowing an interaction with the image to arrange at least one element with respect to the image to form an arrangement; and prescribing at least one parameter for obtaining a tomosynthesis image based at least in part on the arrangement. In an embodiment, the method further includes performing tomosynthesis in accordance with the at least one parameter. In an embodiment, the at least one element includes a detector representation. In an embodiment, the at least one element includes at least one thickness guide. In an embodiment, the at least one element includes at least one slice location guide. In an embodiment, the at least one parameter includes at least one of: a detector position, a detector size, a thickness size, a thickness position, a slice size, a slice position, a slice thickness, a slice separation, a field of view, a reconstruction algorithm, a hanging protocol, and an image processing routine. In an embodiment, the at least one parameter includes at least one of: an x-ray source location, an x-ray source angulation, an x-ray beam intensity, an x-ray beam gating, and a detector sensitivity.

17 Claims, 9 Drawing Sheets

METHODS AND SYSTEMS FOR PRESCRIBING PARAMETERS FOR TOMOSYNTHESIS

This application is a continuation-in-part of U.S. patent application Ser. No. 10/613,591, filed on Jul. 3, 2003 now U.S. Pat. No. 7,433,507, which is herein incorporated by reference in its entirety.

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

Embodiments of the present application relate generally to prescribing parameters for tomosynthesis. Particularly, certain embodiments relate to prescribing parameters based on an interaction with a localization image.

Digital tomosynthesis imaging is a technique that requires the acquisition of multiple x-ray images at different angles relative to the patient within a relatively short time interval. Once these images have been acquired, a reconstruction algorithm is applied to the data represented by the images to reconstruct "slices" through the patient. These slices, which are essentially re-constructed x-ray images of selected planes within an object or patient, may eliminate any structures underlying or overlying a particular area or region of interest and thereby allow for improved diagnosis and treatment.

The standard digital radiography (DR) image acquisition, processing, and display chain was not designed with tomosynthesis in mind. As a result, the use of standard digital radiography processes and procedures presents a number of potential problems when used in the performance of digital tomosynthesis. For example, patient motion in-between the successive acquisitions may result in images that include motion artifacts. Similarly, physiologic motion (e.g., motion of the heart, lungs, etc.) in-between the successive acquisitions may also result in images that include motion artifacts. Other potential problems, such as intensity and resolution non-uniformities, may arise as a result of the angulation of the source of the x-rays relative to the detector. Yet another potential problem is that the use of large angulation ranges may result in increased scatter when no grid is used. Furthermore, errors and uncertainty in the positioning of the source and the detector may result in image reconstruction artifacts. Still another potential problem is that the reduced exposure used in tomosynthesis (relative to the standard single acquisition) may result in increased noise being present in the resulting images.

While various efforts have been made to address some of these potential problems, these efforts have generally been narrowly focused in one particular problem area. Moreover, these efforts have generally failed to address several potential opportunities that may be possible due to the additional information and data provided by digital tomosynthesis. One such opportunity involves the non-disruptive incorporation of three-dimensional imaging techniques into a traditional two-dimensional imaging system and workflow. Another such opportunity relates to the application of computer aided detection (CAD) algorithms to the additional image information that is generated by tomosynthesis. Still another opportunity is presented to create and utilize new visualization techniques that will enhance the diagnostic value of the additional information generated by tomosynthesis.

It would be advantageous to provide a system or method of addressing, overcoming, or reducing the impact of more than a narrow subset of the problems that may arise as a result of using the standard digital radiography image acquisition, processing, and display chain for tomosynthesis. It would also be advantageous to provide a system or method that capitalizes on any one or more of the potential opportunities presented by digital tomosynthesis. Accordingly, it would be advantageous to provide a system or method that has any one or more of these or other advantageous features.

BRIEF SUMMARY OF THE INVENTION

Certain embodiments of the present invention provide a method for performing tomosynthesis including: receiving an image representative of an anatomy of a patient; allowing an interaction with the image to arrange at least one element with respect to the image to form an arrangement; and prescribing at least one parameter for obtaining a tomosynthesis image based at least in part on the arrangement. In an embodiment, the method further includes performing tomosynthesis in accordance with the at least one parameter. In an embodiment, the at least one element includes a detector representation. In an embodiment, the at least one element includes at least one thickness guide. In an embodiment, the at least one element includes at least one slice location guide. In an embodiment, the at least one parameter includes at least one of: a detector position, a detector size, a thickness size, a thickness position, a slice size, a slice position, a slice thickness, a slice separation, a field of view, a reconstruction algorithm, a hanging protocol, and an image processing routine. In an embodiment, the at least one parameter includes at least one of: an x-ray source location, an x-ray source angulation, an x-ray beam intensity, an x-ray beam gating, and a detector sensitivity. In an embodiment, the interaction is performed at least in part automatically. In an embodiment, the tomosynthesis is performed at least in part automatically.

Certain embodiments of the present invention provide a system for performing tomosynthesis including: a user interface configured to allow a user to interact with a processor; and an application capable of running on the computer, wherein the application is capable of receiving an image representative of a patient; wherein the user may interact with the application through the user interface to arrange at least one element with respect to the image to generate at least one parameter for performing tomosynthesis. In an embodiment, the at least one element includes at least one of: a detector representation, at least one thickness guide, a field of view guide, and at least one slice location guide. In an embodiment, the at least one parameter includes at least one of: a detector position, a detector size, a thickness size, a thickness position, a slice size, a slice position, a slice thickness, a slice separation, a field of view, a reconstruction algorithm, a hanging protocol, and an image processing routine. In an embodiment, the at least one parameter includes at least one of: an x-ray source location, an x-ray source angulation, an x-ray beam intensity, an x-ray beam gating, and a detector sensitivity. In an embodiment, the application is capable of automatically arranging the at least one element. In an embodiment, the system further includes a tomosynthesis system communicatively linked to the computer for acquiring at least one tomosynthesis image, the tomosynthesis system including an x-ray source having a position and an angulation, and an x-ray detector.

Certain embodiments of the present invention provide a computer-readable storage medium including a set of instructions for execution on a computer, the set of instructions including: a reception routine for receiving an image representative of an anatomy of a patient along a dimension; an interaction routine for allowing an interaction with the image to arrange at least one element with respect to the image to form an arrangement; and a prescription routine for prescribing at least one parameter for obtaining a tomosynthesis image based at least in part on the arrangement. In an embodiment, the set of instructions further includes a tomosynthesis routine for performing tomosynthesis in accordance with the at least one parameter. In an embodiment, the at least one element includes at least one of: a detector representation, at least one thickness guide, a field of view guide, and at least one slice location guide. In an embodiment, the at least one parameter includes at least one of: a detector position, a detector size, a thickness size, a thickness position, a slice size, a slice position, a slice thickness, a slice separation, a field of view, a reconstruction algorithm, a hanging protocol, and an image processing routine. In an embodiment, the at least one parameter includes at least one of: an x-ray source location, an x-ray source angulation, an x-ray beam intensity, an x-ray beam gating, and a detector sensitivity.

Figure 1:
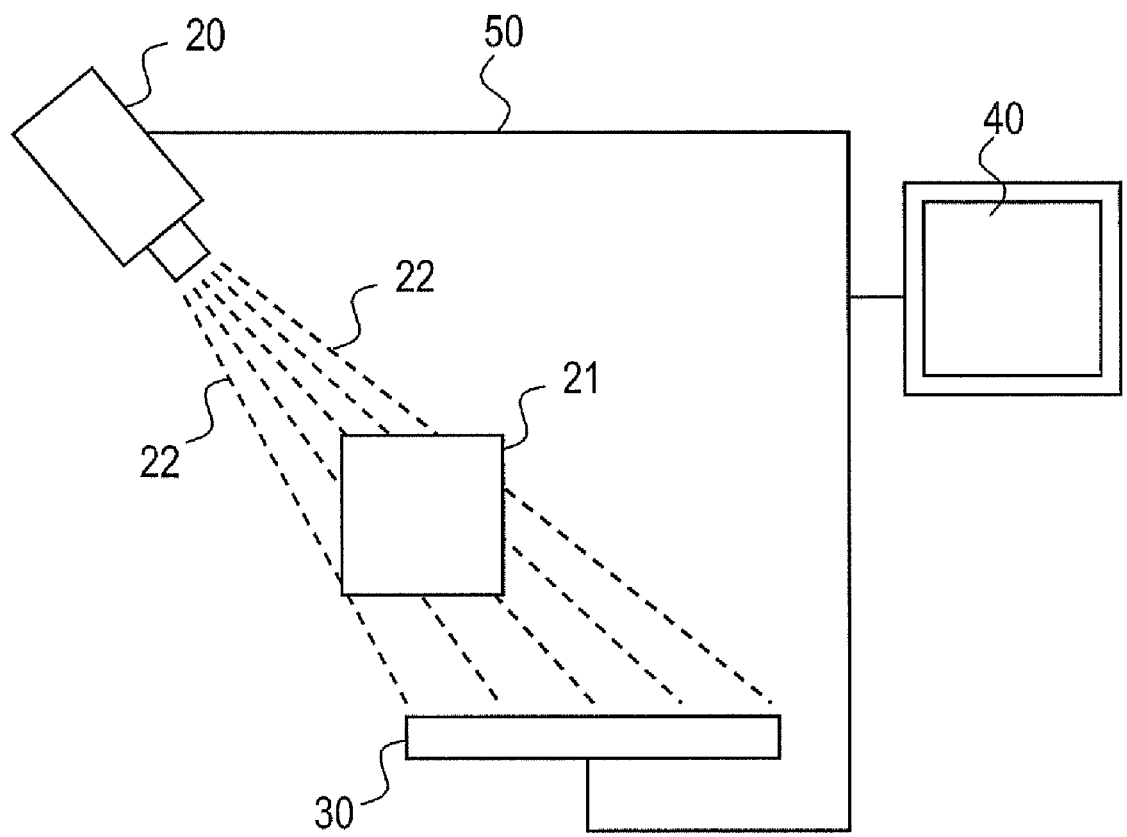
FIG. 1 is a schematic diagram of a tomosynthesis system according to one embodiment of the invention.

The foregoing summary, as well as the following detailed description of certain embodiments of the present application, will be better understood when read in conjunction with the appended drawings. For the purpose of illustrating the invention, certain embodiments are shown in the drawings. It should be understood, however, that the present invention is not limited to the arrangements and instrumentality shown in the attached drawings. Further, some figures may be representations of the type of display and/or output associated with methods and systems of the present invention, in accordance with one or more embodiments.

DETAILED DESCRIPTION OF THE INVENTION

Referring to FIG. 1, a tomosynthesis system 10 is shown schematically according to a preferred embodiment. Tomosynthesis system 10 includes an x-ray source 20, a detector 30, a computer 40, and supporting structure 50.

X-ray source 20 is directed toward a subject 21 (e.g., object, patient, etc.) and is configured to emit a beam of x-rays 22 at desired times. Once x-rays 22 are emitted, they pass through subject 21 and are picked up by, or hit, detector 30.

Detector 30 (e.g., x-ray detector, digital radiography detector, flat panel detector, flat detector, etc.) may be any one of a variety of different detectors conventionally known within the art or that will become available in the future (e.g., energy discriminating detectors that are theoretically capable of acquiring high and low energy images simultaneously). However, according to a preferred embodiment, detector 30 is a flat panel digital detector. When x-rays 22 are picked up by detector 30, they are converted into electrical signals that are sent to computer 40. The electrical signals will vary depending on a number of factors, including the angle at which x-rays 22 hit detector 30, the intensity of the different x-rays that hit detector 30, and a number of other factors. Based on these electrical signals, computer 40 is then capable of creating an image of the internal structures of subject 21.

Computer 40 (e.g., processor, controller, etc.) includes processing circuitry that executes stored program logic and may be any one of a variety of different computers, processors, or controllers (or combination thereof) that are available for and compatible with the various types of equipment and devices used in tomosynthesis system 10. Through its various processors and controllers computer 40 controls the operation and function of source 20 and detector 30. For example, computer 40 may control, among other functions and operations, when source 20 emits x-rays, how detector 30 reads and conveys information or signals after the x-rays hit detector 30, and how source 20 and detector 30 move relative to one another and relative to subject 21. Computer 40 also controls how information (e.g. images or data acquired during the tomosynthesis operation) is processed and displayed. The different processing steps performed by computer 40 are dictated and controlled by software designed to allow computer 40 to perform the various operations underlying tomosynthesis. Information may also be stored in computer 40 for later retrieval and use. Computer 40 may further have a user interface for allowing a user to interact with an application executing on the computer.

During the tomosynthesis operation or process, multiple images of subject 21 are acquired from different perspectives or angles. In order to acquire the images from different perspectives, any one or more of source 20, detector 30, and subject 21 may move relative to one or more of the others while the images are being acquired. This motion may take place at the same time the images are being acquired or in-between the different image acquisitions. The movement of source 20, detector 30, and/or subject 21 (which may be accomplished through a movable table or support structure, which is not shown) are generally controlled by computer 40 based on information entered into computer 40 by someone operating the tomosynthesis equipment, based on pre-defined acquisition protocols, or based on information that has already been acquired by computer 40.

Figure 2:
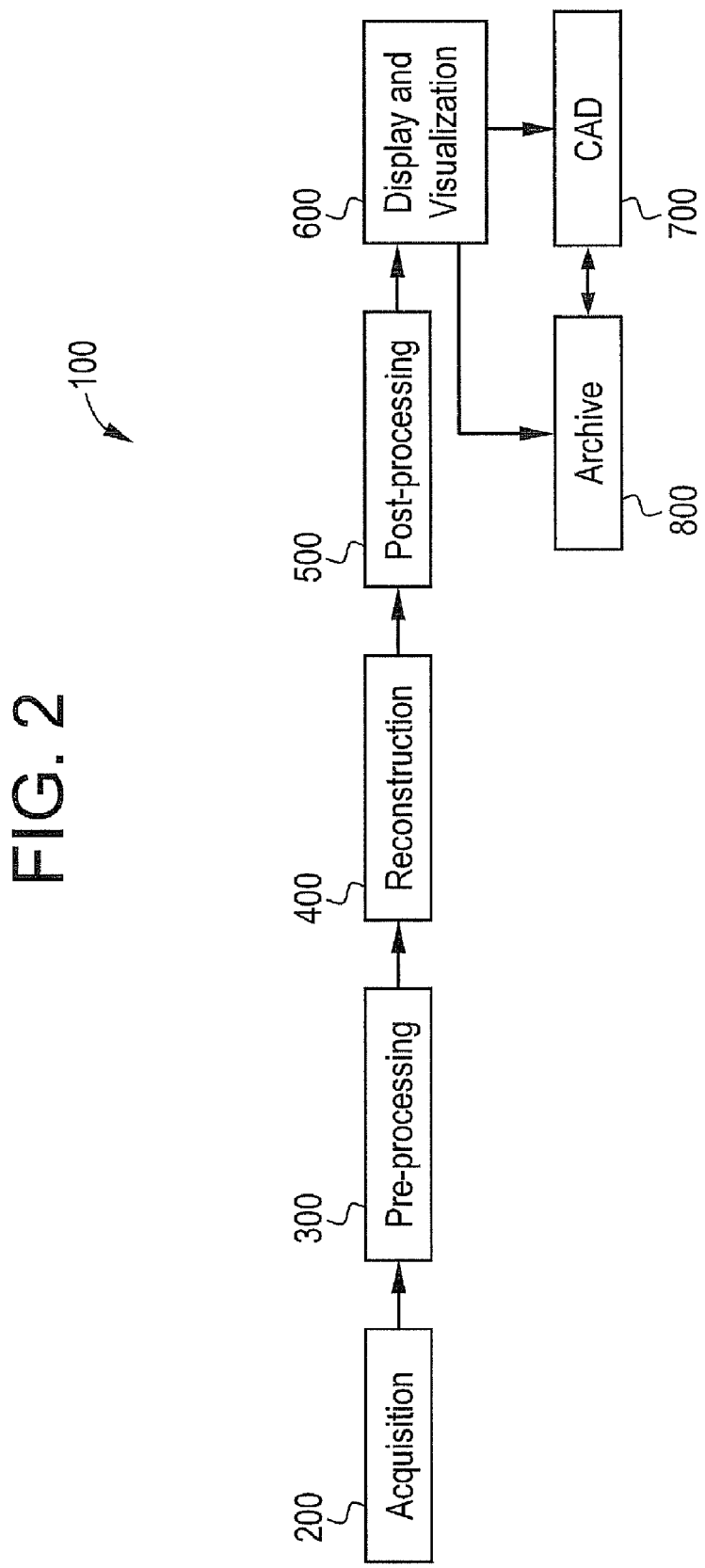
FIG. 2 is a flowchart showing the steps in a tomosynthesis imaging chain according to a preferred embodiment.

Referring to FIG. 2, an imaging chain 100 that is utilized in the tomosynthesis process is shown according to a preferred embodiment. Imaging chain 100 includes steps 200, 300, 400, 500, 600, 700, and 800.

Figure 3:
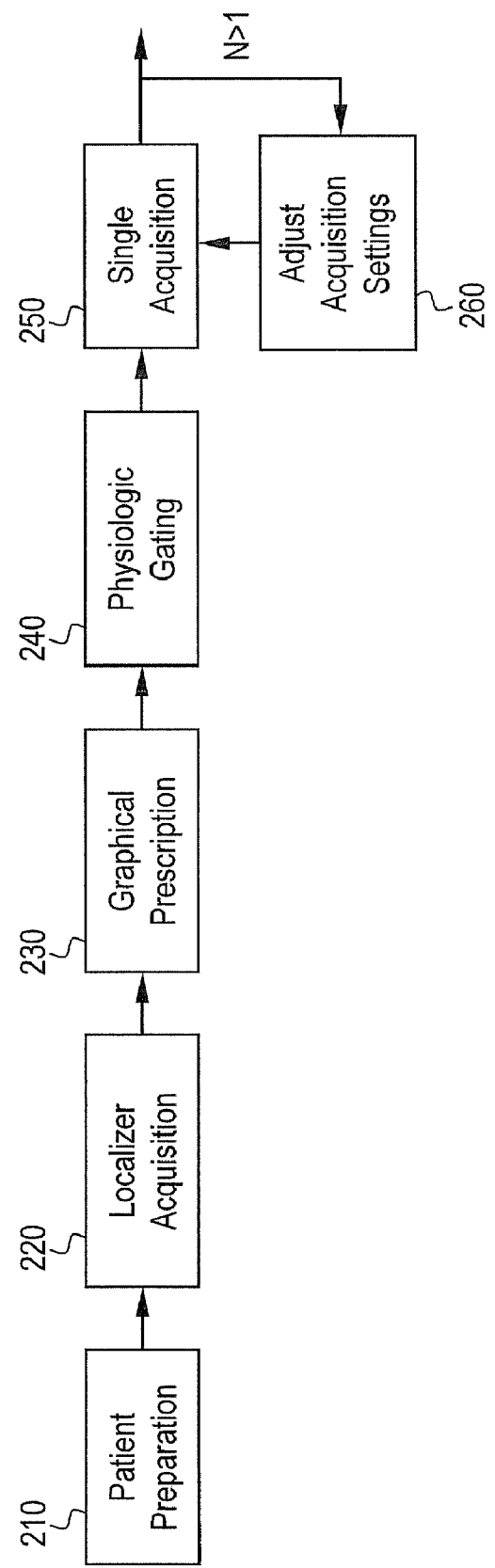
FIG. 3 is a flowchart showing the first step illustrated in the tomosynthesis imaging chain of FIG. 2.

During step 200 (e.g., the acquisition step), the patient is prepared for the tomosynthesis process and the x-ray images are acquired. Referring now to FIG. 3, step 200 can be broken down into sub-steps 210, 220, 230, 240, 250, and 260. At sub-step 210, the patient and x-ray equipment are prepared for the acquisition of x-ray images. This preparation includes generally determining where the x-rays will be focused, placing the patient in the appropriate location, and preparing the x-ray equipment to take images or acquisitions in the desired region of the patient. This may be done through the use of external markers, by placing fiducial markers on the patient, by placing calibration objects in the field of view, through the use of light-field or laser positioning aids (e.g. a cross-hair projected onto the patient that corresponds to the target area), and/or by placing or selecting automatic exposure control sensor(s), etc. According to alternative embodiments, other methods may be used to prepare the patient and x-ray equipment. Moreover, any of the methods may be used individually or in combination with other methods.

At sub-step 220, a "pre-tomosynthesis" image or acquisition (e.g. a localizer acquisition) is acquired in order to get information relating to patient positioning, patient characteristics, and/or acquisition characteristics or parameters. For example, any projection image acquired during a tomosynthesis sequence may be usable and/or acquirable for the pre-tomosynthesis image. With respect to patient characteristics, the image may provide information such as body thickness and general anatomy and may additionally help with the location and identification of any implantable devices or non-standard structures (e.g. a missing lung, an enlarged heart, etc.). This information, along with other information the pre-tomosynthesis image may provide, may be used by computer 40, or by the operator in a semi-automatic mode, as a basis for optimizing the parameters or characteristics of subsequent acquisitions. For example, the information provided by the pre-tomosynthesis image may be used as a basis for optimizing the energy level of the x-rays used in the subsequent acquisitions, the pulse duration, the tube current, the tube current duration, etc. The pre-tomosynthesis image may be acquired using an equal or lower dose of x-rays than is used to acquire images in later steps in imaging chain 100 (described below). According to one embodiment, the image generated during sub-step 220 may not be utilized during the reconstruction process (described below). According to an alternative embodiment, the pre-tomosynthesis image may be "re-used" in later steps of imaging chain 100 (e.g. one less image may be needed during subsequent steps that would otherwise be required in the absence of the localizer acquisition). According to another alternative embodiment, sub-step 220 may not be part of step 200 and may not be included in imaging chain 100. According to another alternative embodiment, the information provided by any image acquired during the tomosynthesis process may be used as a basis for optimizing the acquisition parameters or characteristics of subsequent acquisitions.

At sub-step 230 (e.g., the graphical prescription step), a variety of parameters relating to the images that will be taken during later steps in imaging chain 100 are selected and set. These parameters relate to the field of view, the method used to control the dose of the x-rays, the energy level of the x-rays, how the x-ray source will be moved during the acquisitions, whether the acquisition will require a field of view larger than the detector area, the acquisition paths of the source and detector, the slice characteristics, and the presence or absence of an anti-scatter grid.

The field of view may be selected by specifying a region of interest within the localizer acquisition taken in sub-step 220. This may be done interactively on computer 40, which displays the localizer acquisition, by indicating where in the resulting image the x-rays should be targeted or focused. The field of view may also be selected by specifying and entering coordinates consisting of reference points defined relative to the patient. In addition, a volume of interest within the patient may be defined by specifying a region of interest in the image as well as a start and end height above the detector (e.g., a thickness of the volume of interest). The number of slices to be reconstructed and the slice separation may also be defined. Slice separation may be predetermined, determined by the acquisition configuration (e.g., the maximum angle), or selected by the operator. In combination with the volume of interest, a variable-opening collimator may be controlled so as to optimally cover the volume of interest, while minimizing the dose of x-rays received by the patient.

There are at least three methods that may be used to control the dose of x-rays received by the patient. The first method is to use ion chambers to automatically control the exposure of the patient to x-rays. The second method is to fix the time/pulse-width of the x-rays used to generate the acquisitions. The third method is to automatically calculate an optimal dose using information from the localizer image or from a previous acquisition in the series of acquisitions acquired during the tomosynthesis process. According to alternative embodiments, other conventional methods of controlling the dose of x-rays received by a patient or subject may be used.

The energy level of the x-rays can be set to a single energy level or to multiple energy levels. For example, at each position and angle of acquisition, a single image can be acquired at a specific energy level, or several images can be acquired at different energy levels. Moreover, the energy level may also vary as a function of the projection angle.

With respect to selecting how the x-ray source will move during acquisitions, the acquisition can be made while the x-ray source is moving (e.g. a continuous acquisition) or after the source settles into each position (e.g. a step & shoot acquisition). The detector may also move, either during the exposure, which may tend to minimize blurring in the continuous scan, and/or between exposures, which tends to optimize the covered volume. To achieve better image quality, or minimize required corrections, the detector may be tilted towards the incident x-ray beam.

If a large field of view (e.g. a field of view that is larger than the detector area) is required, tomosynthesis system 10 may be configured to take multiple tomosynthesis sweeps in succession, and then "paste" or "stitch" the corresponding acquired images together before passing them to the next step in the imaging chain. In an alternative embodiment, the acquired images are used to reconstruct more than one volume of interest, and the pasting or stitching is performed after the 3D reconstruction. If a smaller field of view (e.g. a field of view that is smaller than the detector area) may be preferable, an x-ray beam (e.g. beam 22) may be collimated to correspond with the smaller field of view, for example. Collimation to reduce the size of the beam may reduce x-ray exposure to a patient, or may enable a reconstruction algorithm to reconstruct the smaller field of view, for example.

The paths along which the source and detector travel during the process of acquiring images may also be defined. These paths (which may be one-dimensional, two-dimensional, three-dimensional, etc.) are defined by the position or angular orientation (e.g., tilt) of the source and the detector as well as the angle of the source relative to the detector. Moreover, factors such as the type of clinical application, the portion of the anatomy that is of interest, the volume that is of interest, and the size of the patient may be taken into account in selecting the desired path.

Other parameters that may be adjusted relate to the slice characteristics. These parameters relate to the number of slices, the slice thickness (which may be variable or fixed), the slice orientation (e.g. the angle of the slices with respect to detector plane), the start depth, and the end depth. It is also possible to reconstruct on non-planar slices, where the shape or curvature of the slices may be adapted to the anatomy to be imaged.

Still another parameter or option that may be selected is whether to include the anti-scatter grid. If an anti-scatter grid is selected, one of a plurality of available grids may then be selected.

At sub-step 240, the time at which images are acquired is linked to certain physiological signals or events, which is referred to as physiologic gating. Physiologic gating helps to maintain uniformity between the different acquisitions and to increase the quality of the results of the tomosynthesis process. According to one embodiment, a physiological signal such as a patient's heart rhythm (EKG) or breathing cycle is detected and is used as a basis for triggering the acquisition of images. According to this embodiment (referred to as prospective physiologic gating), the timing of the acquisition of images is linked to the physiological events such that acquisitions are taken at certain points or at certain intervals in the physiologic cycle. According to another embodiment, the physiological events are recorded at the time acquisitions are taken. According to this embodiment (referred to as retrospective physiologic gating), the point or interval of the physiological cycle at which the patient is in when the images are acquired is taken into account in the reconstruction and processing of the images in the later steps of imaging chain 100. According to another alternative embodiment, sub-step 240 is not included within imaging chain 100.

At sub-step 250 an acquisition is taken according to the settings selected and applied in the previous steps. Then at sub-step 260, the acquisition parameters are adjusted and another acquisition is taken. Such adjustments to the acquisition parameters may include, but are not limited to, adjustments to the x-ray technique parameters (e.g. the energy level of the x-rays, the pulse duration, the tube current, the tube current duration, etc.), the filtration, the position of acquisition, the angle of acquisition, etc. These adjustments are made to provide the variety of different images (e.g., datasets) that will later be reconstructed into the desired view. In making these adjustments, the x-ray technique parameters may be the same (e.g. constant, fixed, pre-determined) for all images or the parameters may be varied between images. If adjustments are made to the x-ray technique parameters between any of the images, the adjustments may be based on information acquired from the pre-tomosynthesis image, on information acquired from any previous image or images, or on other relevant information. Sub-step 260 is repeated until a sufficient number of images (e.g., datasets) have been obtained to allow computer 40 to reconstruct the desired volume of interest. The acquisition of a sufficient number of images from different perspectives or acquisition angles allows computer 40 to construct a three-dimensional dataset by suitably combining the individual datasets that are represented by particular images. According to alternative embodiments, the acquisitions may be taken while the detector is moving or while the detector is stationary.

Figure 4:
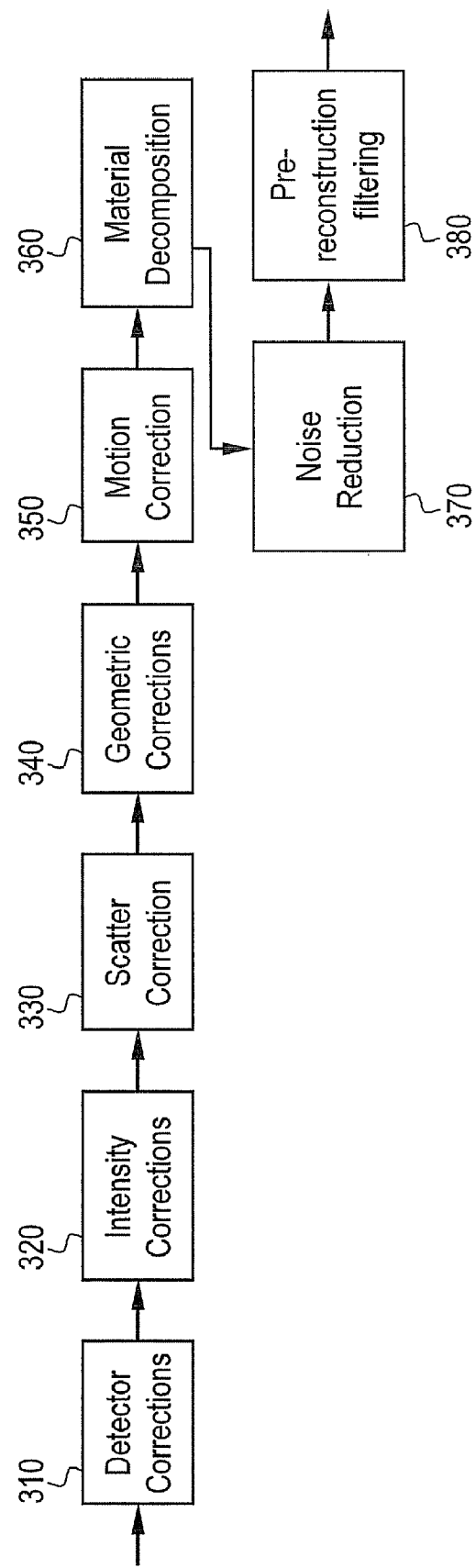
FIG. 4 is a flowchart showing the second step illustrated in the tomosynthesis imaging chain imaging chain of FIG. 2.

As illustrated in FIG. 2, the acquisitions taken in step 200 are processed at step 300. Step 300 (e.g. "pre-processing") involves the processing of the images or acquisitions taken in step 200 to correct or modify various attributes or characteristics of the images. Like step 200, step 300 can be broken down into a number of different sub-steps, which are illustrated in FIG. 4.

At sub-step 310, various corrections (e.g., detector corrections, etc.) are made to correct properties of the images that arise as a result of the use of a detector, and in particular, a flat panel digital detector. These corrections include bad pixel/ line correction, gain map correction, corrections specific to dual energy acquisitions (if used) such as laggy pixel corrections, etc.

At sub-step 320, intensity corrections are made. Intensity corrections include corrections of variations due to the imaging geometry, such as ($1/r.sup.2$) attenuation, heel effect, and tube angulation. Intensity corrections may also include corrections to the sensitivity map of the detector, corrections to offset the effects of Modulation Transfer Function (MTF) variations, etc. Finally, intensity corrections may also include corrections of intensity variation due to use of different x-ray energies at different positions/angles.

At sub-step 330, scatter corrections, which are particularly important when no scatter grid is used during the acquisition of the images, are made to reduce the effects of scatter. Scatter corrections can be made using scatter reduction algorithms that use information from multiple energy images to perform the correction. Scatter correction can depend on the angle of acquisition or be angle-independent.

Sub-steps 310, 320, and 330 can be used in combination to achieve quantitative images in situations such as where the values at each pixel correspond to the line integral of the attenuation coefficient along the corresponding ray. Reference calibration measurements also may be used to achieve quantitative images.

At sub-step 340, geometric corrections are made to reduce the effects of any non-uniformities in the equipment setup or operation. Such non-uniformities may include, for example, deflection or sag in supporting structure 50 of tomosynthesis system 10, which may cause the source and the detector to be slightly out of position with respect to one another. Non-uniformities may also include, among other things, jitter in the track (e.g., railing, channel, guide, etc.—not shown) along which source 20 and detector 30 move. Geometric corrections may be based on calibration events or runs that are performed once after the installation of tomosynthesis system 10 or they may be based on calibration events or runs that are repeated on a periodic basis. According to alternative embodiments, the geometric corrections may be based on image information using, for example, fiducial or anatomical markers. According to other alternative embodiments, geometric corrections may be relative (i.e., the geometry used may not be the "true" geometry) or absolute without compromising the reconstructed image quality.

At sub-step 350, motion corrections are made to account for any motion of the patient that may have occurred between acquisitions (e.g., contractions of the heart, expansion or contraction of the lungs, external movement, etc.). Motion corrections are made by aligning (e.g., registering) the images based on the anticipated position of external fiducial markers or anatomic landmarks, including aligning or registering the multiple energy images acquired at a single position and angle.

At sub-step 360, material decomposition is performed. Material decomposition is applicable when multiple energy acquisitions are used and serves to create separate images of different tissue types (e.g., creates a separate image of bone and a separate image of soft-tissue). Techniques such as log-subtraction or basis material decomposition may be used to perform the material decomposition.

At sub-step 370, any "noise" present in the images is removed or reduced. The noise reduction process is based on noise reduction algorithms. These algorithms may be applied to images independently, or the algorithms may share information across images.

At sub-step 380, various filtering techniques (e.g. pre-reconstruction filtering) may be applied to the acquisitions.

Such filtering techniques may include frequency filtering for specific tissue and/or structure enhancement, tissue equalization, spatial filtering, image resizing/shrinking, etc. These operations or techniques can be tailored to the specific reconstruction technique or techniques used, to the acquisition parameters, and to various attributes of the patient.

According to alternative embodiments, each of sub-steps 330, 350, 360, and 370 are optional steps that may not be included within imaging chain 100.

Figure 5:
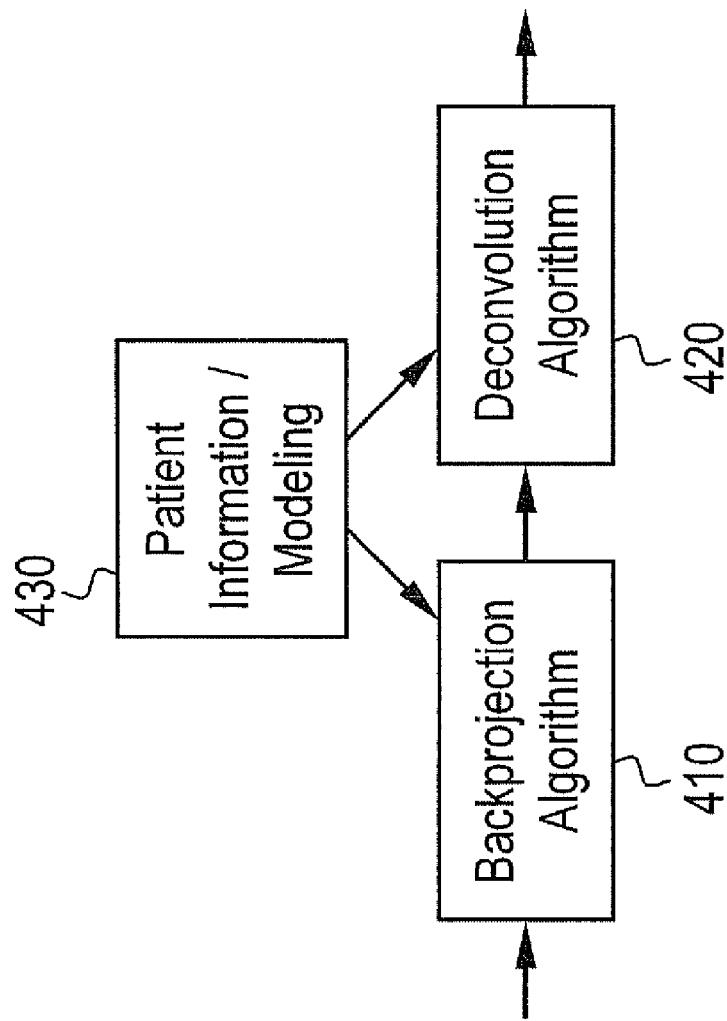
FIG. 5 is a flowchart showing the third step illustrated in the tomosynthesis imaging chain imaging chain of FIG. 2.

As illustrated in FIG. 2, the acquisitions processed at a step 300 are reconstructed at step 400. Step 400 (e.g. "reconstruction") involves using the data and information from the acquired images to construct an image (e.g. a "slice," reconstructed image, etc.) of the patient. Referring now to FIG. 5, step 400 may include sub-steps 410, 420, and 430.

At sub-step 410, the acquisitions obtained in the previous steps are reconstructed (e.g. constructed, transformed, rendered, etc.) into one or more slices through the patient (or other object) using a 3D reconstruction algorithm. The reconstruction algorithm may employ a cone-beam geometry (which may allow for precise measurements of the size of objects, but which may be computationally somewhat slow), or a parallel beam geometry (which is computationally fast, but which may result in variances of the physical distances between pixels as a function of the height of the reconstructed slice or image). The techniques through which the acquisitions are reconstructed include shift and add, filtered back projection (FBP), generalized filtered back projection (GFBP), Fourier reconstruction, objective function-based reconstruction, variations of the algebraic reconstruction technique (ART), matrix inversion tomosynthesis (MITS), order statistics-based back-projection (OSBP), or any combination or these or other reconstruction techniques. The reconstruction also may make use of prior information, which may include, but is not limited to, a geometric model of the relevant anatomy or physical constraints of a patient. Such prior information may also include information pertaining to the point in the physiological cycle at which the patient or subject was in when a particular image was acquired. Such prior information may further include information pertaining to the chemical composition and associated attenuation spectra of tissues in the body. Such prior information may additionally include previously acquired medical scans of the patient, such as x-ray tomosynthesis, CT, MR, and/or ultrasound imagery. Moreover, the reconstruction may involve using additional images (e.g., using an additional lateral (LAT) view in addition to the posterio-anterior (PA) tomosynthesis sequence, or using a PA and a LAT tomosynthesis sequence).

At sub-step 420, a deconvolution algorithm is used to help remove any blur that may arise from sub-step 410. According to an alternative embodiment, sub-step 420 may be excluded from step 400 and from imaging chain 100.

At sub-step 430, patient information is input into the 3D reconstruction process (sub-step 410) and/or the deconvolution process (sub-step 420) to improve or optimize the overall reconstruction process. The patient information may include information relating to current or historical physical and pathological conditions (e.g., size, composition, abnormal anatomy, etc.) and/or to the acquisition parameters of previous acquisitions (e.g., the energy level of the x-rays, the pulse duration, the tube current, the tube current duration, the filtration, the position of acquisition, the angle of acquisition, etc.). To use such information in the reconstruction process, patient qualitative and/or quantitative model(s) are formed. The use of the patient information in this manner may help to optimize reconstruction with respect to the parameters of acquisition and/or the patient or imaged anatomy. According to an alternative embodiment, sub-step 430 is an optional step that may be excluded from step 400 and from imaging chain 100.

Figure 6:
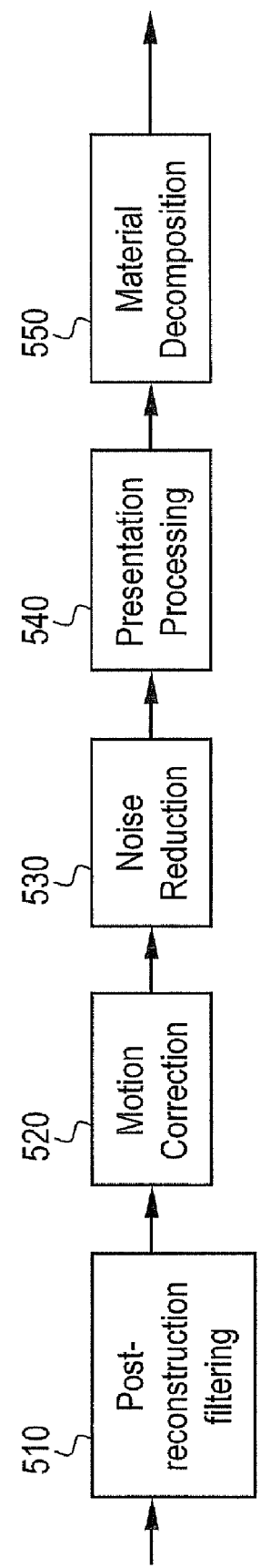
FIG. 6 is a flowchart showing the fourth step illustrated in the tomosynthesis imaging chain imaging chain of FIG. 2.

Referring now to FIGS. 2 and 6, the images (e.g. slices) reconstructed in step 400 are then subjected to further processing at step 500. Step 500 (e.g. "post-processing") involves the processing of the images reconstructed in step 400 to correct, remove, adjust, enhance, etc. various attributes or characteristics of the images. The post-processing of step 500 can be broken down into sub-steps, which are illustrated in FIG. 6.

At sub-step 510, the reconstructed images are filtered to remove potential artifacts or attributes, such as streaking, that may arise as a result of the reconstruction step 400. The information conveyed by the images may also be enhanced. According to alternative embodiments, this enhancement of the image information may include, among other things, the removal of ribs and direction filtering.

At sub-step 520, any residual motion artifacts contained within the images created during step 400 are removed or reduced. Such artifacts may include soft-tissue detail blurring, bone edge blurring, heart contour shadowing, overshoot/undershoot at the edges of an organ, etc.

At sub-step 530, noise reduction algorithms similar to those utilized in sub-step 370 are applied to the reconstructed images to reduce or eliminate the effects of "noise" within the images. The noise reduction algorithms may be applied to the images independently, or the algorithms may share information across images.

At sub-step 540, various attributes of the reconstructed images that relate to the presentation of those images are processed. This processing may include edge enhancement, tissue equalization, and the adjustment of the display window level and window width for optimal display. Look-up tables for clinical displays that are specific to certain applications also may be applied. Appropriate dynamic range management (DRM) algorithms also may be applied.

At sub-step 550, material decomposition techniques, including log-subtraction and basis material decomposition, are applied to the images when three-dimensional data sets from multiple energy acquisitions have been reconstructed separately.

According to alternative embodiments, each of sub-steps 510, 520, 530, 540 and 550 are optional steps that may not be included within imaging chain 100.

Figure 7:
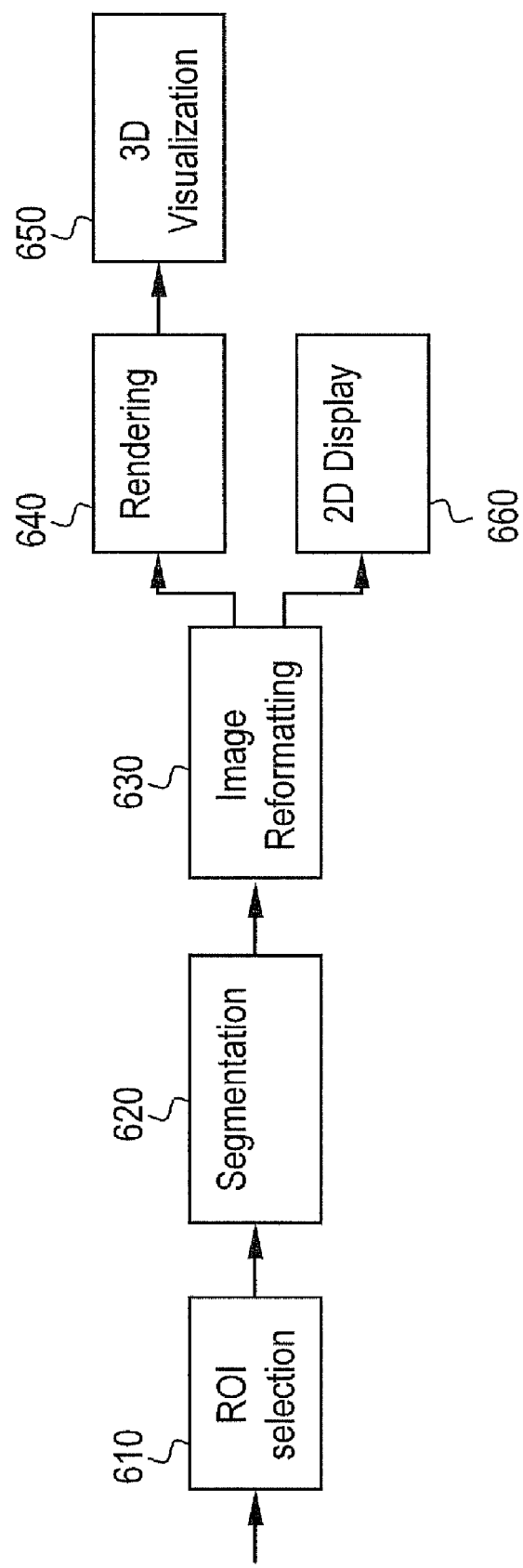
FIG. 7 is a flowchart showing the fifth step illustrated in the tomosynthesis imaging chain imaging chain of FIG. 2.

Referring now to FIGS. 2 and 7, step 600 consists of presenting and/or analyzing the information processed in step 500. Like the previous steps, sub-step 600 can be broken down into several sub-steps.

At sub-step 610, the region-of-interest (e.g., the particular part of the subject or patient one wishes to examine) is selected for display and visualization. According to alternative embodiments, the selection of the region-of-interest may be interactive (e.g., selected manually) or the selection may be automatic or semi-automatic. An automatic or semi-automatic selection may be based on the automatic localization of anatomical features or other distinct features of the subject or patient.

At sub-step 620, a specific structure or tissue is segmented for display and visualization. Such segmentation may be done for each slice individually or it may be based on information acquired across the different slices At sub-step 630, the image (or the data on which the image is based) is reformatted and/or re-mapped. The reformatting and/or re-mapping of sub-step 630 may include Multi-Planar Reformatting (MPR) for "slicing" data sets at different angles, Maximum Intensity Projection (MIP), or various other reformatting or re-mapping techniques.

At sub-step 640, the image may be rendered. The rendering may be surface or volume rendering and may include the adjustment of transparency levels.

At sub-step 650, the rendered data set is displayed. According to alternative embodiments, the viewing perspective and other parameters may be controlled interactively or they may run in a loop using predetermined settings. In one embodiment, some of the display parameters may depend on specific parameters of the acquisition. For example, the maximum viewing angle may be limited as a function of the tube angles utilized during the acquisition.

As an alternative to sub-steps 640 and 650, the data may be viewed as a two-dimensional set of images in sub-step 660. This may be done by looking at the images side-by-side, by looking at the images in a cine loop according to a temporal display, by interactively toggling between the different slices, or by using any one of a plurality of other different two-dimensional viewing techniques. In one embodiment, the two-dimensional images can be generated from the reconstructed slices (e.g., by taking the average of appropriate subsets of slices).

According to alternative embodiments, any one or more of sub-steps 610, 620, 630, 640, and 650 is optional and may be excluded from imaging chain 100.

Referring now to FIG. 2, imaging chain 100 also includes step 700. Step 700 includes using computer 40 to aid or assist in the processing and/or diagnosis of various attributes or characteristics embodied within the acquisitions and corresponding data, which is known as computer-aided detection (CAD). Step 700 is performed using processing and diagnosis algorithms, which can be general radiography algorithms or which can be tailored to tomosynthesis slices and/or three-dimensional datasets. The CAD algorithm may act on the projection images (e.g. the images upon which the reconstructed slices are based), the reconstructed slices, the full three-dimensional dataset, or any combination of these. CAD may include a consistency check, for example in the case of CAD acting on the projection images, where the suspicious regions that are detected are linked via the reconstructed three-dimensional geometry. Moreover, CAD results may be used as a basis for the automatic choice of the region-of-interest for display. Furthermore, using the results of segmentation and/or quantitative images, CAD can provide quantitative results, such as the size and/or thickness of lesions. CAD can also include temporal analysis of datasets, for example temporal subtraction images, combined with registration techniques. According to an alternative embodiment, step 700 is an optional step that may be excluded from imaging chain 100.

Referring still to FIG. 2, step 800 includes storing the images and data for future retrieval, analysis, comparison, etc. Once the images and data have been stored, they can be used as input into a CAD system or can be directly viewed at a later time.

According to a preferred embodiment, the various steps and sub-steps described above are performed in the order in which they are described and depicted in FIGS. 1-7. However, according to alternative embodiments, the steps and sub-steps may be performed in any order or sequence. Referring to FIG. 1, a tomosynthesis system 10 is shown schematically according to an embodiment of the present invention. Tomosynthesis system 10 may include an x-ray source 20, a detector 30, a computer 40, and supporting structure 50, for example.

Figure 8:
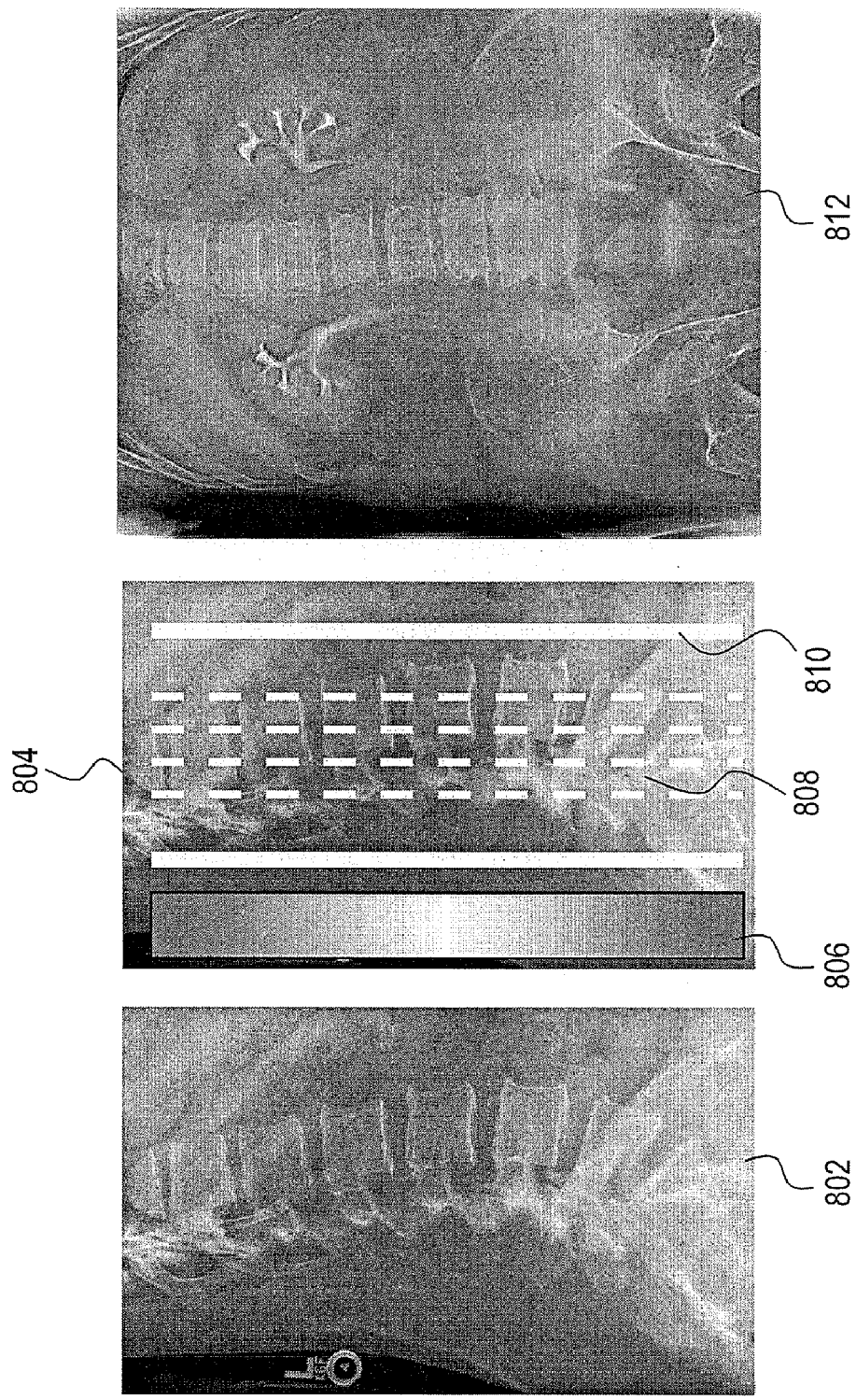
FIG. 8 shows a series of images illustrative of localizer acquisition, in accordance with an embodiment of the present invention.

Turning to FIG. 8, a series of images 800 illustrative of localizer acquisition (e.g. similar to sub-steps 210 and/or 220 described in conjunction with FIG. 3) is shown, in accordance with an embodiment of the present invention.

Image 802 shows a lateral (e.g. sagittal) image of a patient. Image 802 may be usable as a localizer acquisition image. Other views besides a lateral image may also be usable as a localizer image—e.g. coronal, axial, oblique, three dimensional, and/or the like. An image usable as a localizer image may be generated by a variety of radiological techniques, for example. For example, an image usable as a localizer image may be generated by computed tomography (CT), positron emission tomography (PET), magnetic resonance imaging (MRI), x-ray, ultrasound, and or the like. An image usable as a localizer image may be generated relatively soon before tomosynthesis imaging, or may have been generated on a different day, month, and/or year, for example. An image usable as a localizer image may also be a live image (e.g. a real-time ultrasound image), for example. Image 802 may be loaded into a computer (e.g. PACS workstation) and displayed to a user, and/or used for subsequent processing, for example.

As shown in image 804, a computer and/or a user (e.g. radiologist) may interact and/or further process image 802 to obtain localization parameters. Image 804 may be representative of an image displayable by a computer (e.g. computer 40 shown in FIG. 1) for determining tomosynthesis parameters, for example. The underlying image shown in 804 may be substantially similar to that shown in 802, for example. Image 804 also shows a representation of a detector 806, thickness guides 810, and one or more slice location guides 808.

The detector representation 806 may correspond to a predicted location of a detector (e.g. detector 30 shown in FIG. 1, such as an x-ray detector, digital radiography detector, flat panel detector, and/or flat detector) during tomosynthesis image acquisition (e.g. sub-step 250 shown in FIG. 3), for example. The detector representation 806 may be positionable by either a computer automatically and/or by a user interacting with a computer, for example. The detector representation 806 may be positionable with respect to the underlying image and/or other elements (e.g. thickness guides 810 and/or slice location guide(s) 808), for example. The size and orientation of detector representation 806 may be selectable (either automatically or with a user interaction) to correspond to different types/sizes of detectors, for example. The size, type, and/or location of the detector representation 806 may further provide information regarding certain aspects of other elements such as thickness guides 810 and/or where slice location guide(s) 808 (e.g. size, orientation, and/or location of other elements). Conversely, the size, type, and/or location of other elements such as thickness guides 810 and/or slice location guide(s) 808 may provide information regarding certain aspects of the detector representation 806 (e.g. size, type, location, etc.).

The thickness guides 810 may correspond substantially and/or generally to a thickness of a tomosynthesis image to be generated. The thickness guides 810 may be positionable by either a computer automatically and/or by a user interacting with a computer, for example. One or more thickness guides 810 may be positionable with respect to the underlying image, other thickness guides 810 and/or other elements (e.g., slice location guide(s) 808), for example. The position and orientation of thickness guides 810 may be selectable (either automatically or with a user interaction) to correspond to clinical preferences, for example. The position of a thickness guide 810 may have a corresponding relationship with position(s) of slice location guide(s) 808, for example (e.g. based on a slice thickness). Consequently, one or more thickness guide(s) 810 may be automatically positioned based on a position of a slice location guide 808, for example. The position of thickness guide 810 may also be independently positionable with respect to slice location guide(s) 808, for example.

Slice location guide(s) 808 may correspond substantially and/or generally to a slice in a tomosynthesis image to be generated. As discussed, slice parameters may be automatically configured, and/or configured through a user interaction. For example, the following may be adjustable: the quantity of slice(s), the thickness of slice(s), the orientation of slice(s), and/or the separation between various slice(s). A user may be able to interact (e.g. drag & drop, resize, copy, paste, rotate, etc.) with slice location guide(s) 808 or the like to adjust aspects of slices. As another option, a user may be able to adjust aspects through a menu, dialogue box, and/or the like, for example. The slice location guide(s) 808 may correspond to entire slice(s), centerline of slice(s), boundar(ies) of slice(s), separation between slice(s), and/or the like, for example. The correspondence may be user selectable and/or automatically configured, for example (e.g. based on clinical preferences).

The slice location guide(s) 808 may be positionable by either automatically and/or through a user interaction, for example. One or more slice location guide(s) 808 may be positionable with respect to the underlying image, other slice location guide(s) 808 and/or other elements (e.g., thickness guide(s) 810), for example. The position and orientation of the slice location guide(s) 808 may be selectable (either automatically or with a user interaction) to correspond to clinical preferences, for example. The position of the slice location guide(s) 808 may have a corresponding relationship with position(s) of thickness guide(s) 810, for example (e.g. based on a slice thickness, number of slices, etc.). Consequently, one or more slice location guide(s) 808 may be automatically positioned based on a position of a thickness guide(s) 810, for example. The position of slice location guide(s) 808 may also be independently positionable with respect to thickness guide(s) 810, for example.

Figure 9:
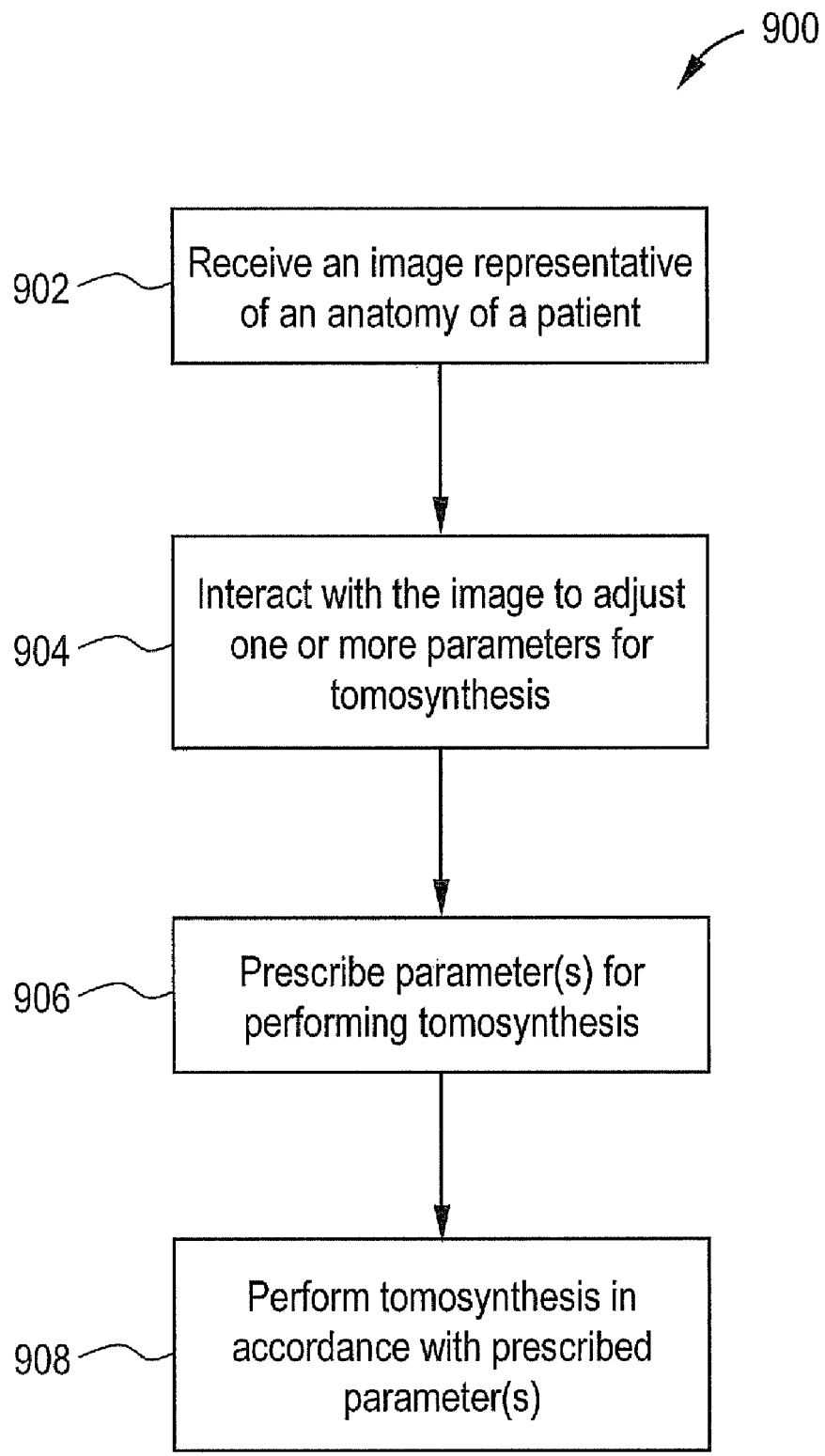
FIG. 9 shows a flowchart of a method for performing localization for tomosynthesis, in accordance with an embodiment of the present invention.

FIG. 9 shows a flowchart of a method 900 for performing localization for tomosynthesis, in accordance with an embodiment of the present invention. The steps of method 900 may be performed in an alternate order as shown, for example. At least some of the steps of method 900 may be performed simultaneously or substantially simultaneously, for example. Furthermore, some steps of method 900 (or portions thereof) may be omitted (e.g. step 908 and/or step 904), for example. The steps of method may be performed by a computer and/or other processor (such as computer 40 in FIG. 1) executing a set of instructions on a computer-readable medium, for example. Further, at least some steps of method 900 may be interchanged and/or interweaved with at least some steps and/or sub-steps of method 100, described above, and vice versa.

At step 902, an image representative of an anatomy of a patient is received. The image may be similar to image 802. The image may be received by an application executed on a computer or processor (e.g. computer 40 shown in FIG. 1). The image may be further adjusted and/or processed once received, for example. For example, the image may be resized, rescaled, and/or reoriented to suit clinical needs. Other aspects of the image may also be adjusted such as color, hue, contrast, brightness, and/or the like, for example. The image may be received from a radiological imaging device (e.g. CT scan) or from a storage (e.g. PACS long-term storage), magnetic media, optical media, and/or the like, for example. The image may be a two dimensional slice or a three dimensional volume. The image may be reconstructed from volumetric data and/or various other data, for example. So, for example, a set of volumetric data may be received for reconstructing one or more images for use in conjunction with method 900. The image may include fiducials to assist with arrangement of the patient, source, and/or detector during tomosynthesis. The fiducials may provide geographical reference points in an imaging environment that assist the clinician in proper arrangement of the patient and/or detector, for example.

At step 904, the image (or a variation thereof) may be interacted with to adjust one or more parameters for tomosynthesis. For example, a user may interact through a user interface and/or through an application with the image. A user interface may be a physical interface and/or a virtual interface, for example. As another example, an application running on a processor and/or computer may interact automatically with the image. An application may provide visual feedback to a user interacting with an image, for example. The feedback display may resemble image 804, for example. Interaction with the image may include an arrangement of a detector representation (e.g. detector representation 806). For example, the following aspects of a detector representation may be arranged: size, type, location, and/or sensitivity. Interaction with the image may include an arrangement of one or more thickness guides (e.g. thickness guide(s) 810). For example, the following aspects of thickness guide(s) may be arranged: size (e.g. surface area, or one-dimensional size), thickness (between guides), and/or orientation (e.g. with respect to image, detector, and/or slice location guide(s)). Interaction with the image may include an arrangement of one or more slice location guides (e.g. slice location guide(s) 808). For example, the following aspects of slice location guide(s) may be arranged: size (e.g. surface area, or one-dimensional size, thickness of a single slice), separation (between guides), and/or orientation (e.g. with respect to image, detector, thickness guide(s), field of view guide(s) and/or slice location guide(s)). Arrangement of various elements may impact how other elements may be arranged. For example, if a detector representation is moved to a different location, this may impact possible locations for slice location guide(s) and/or thickness guide(s). The other elements may move automatically with the detector representation, for example. An application and/or interface may indicate to a user through visual feedback that the arrangement of various elements are not compatible, for example (e.g. the color of various elements could change to a color indicating incompatibility).

The interaction feedback display may also include other environmental structure, such as fiducials. Fiducials may show various geographical markers in the imaging environment, for example. The fiducials may be in the image itself, or may be otherwise present. The fiducials may also be arrangable by a user, for example. The fiducials may assist arrangement of the physical patient and/or detector during, or previous to tomosynthesis, for example.

At step 906, parameter(s) for performing tomosynthesis are prescribed. The parameter(s) may include various parameters discussed in context with FIG. 3, for example. The parameters may result from the arrangement of elements during step 904, for example. Parameters may also result from a deviation of the arrangement of elements during step 904, for example. A given arrangement may not be performable by a particular tomosynthesis system, for example. In such a case, the type of parameter(s) that result from a given arrangement may be overridden, and substituted where appropriate, with parameter(s) that may better suit the tomosynthesis system to be employed, for examples. Parameters may relate either to the desired end-result (e.g. the nature of the tomosynthesis image to be generated) and/or to the process for obtaining the end-result (e.g. source angulation, source gating, source position, source speed, reconstruction, etc.), for example.

At step 908, tomosynthesis is performed in accordance with prescribed parameter(s). For example, tomosynthesis may be performed in accordance with method 100 shown in FIG. 2. Parameters generated at step 906 may be used in a variety of aspects of tomosynthesis imaging, for example. During acquisition (e.g. step 200 shown in FIG. 2), the parameters may provide information regarding the location of the source over time, speed of the source over time, angulation of the source over time, gating of the source over time, intensity of the source over time, duration, and/or number of scans over time, for example. During preprocessing (e.g. step 300 shown in FIG. 2), the parameters may provide information regarding how to correct for various types of detector noise profiles (e.g. different types of detectors), intensity corrections, scatter corrections, geometric corrections, motion corrections, material decomposition correcting, noise filtering, image acquisition, image reconstruction, image display, and/or the like, for example. During reconstruction (e.g. step 400 shown in FIG. 2), the parameters may provide information regarding how to reconstruct acquired data, including slice locations, number of slices, separation between slices, and/or the like, for example. During post-processing (e.g. step 500 shown in FIG. 2), the parameters may be used to assist in the correction, removal, adjustment, enhancement, etc. of various attributes and/or characteristics of the image(s). During display and visualization (e.g. step 600 shown in FIG. 2), the parameters may be used to facilitate and/or improve display, for example. For example, slices may be presented in accordance with how slice location guide(s) were arranged (e.g. shown together, or otherwise identified as corresponding). Additionally, during computer-aided detection (e.g. step 700 shown in FIG. 2) and/or archiving (e.g. step 800 shown in FIG. 2), the parameters may be used to facilitate the various aspects discussed above, for example. The parameters may either be implemented automatically, or through a user interaction, and/or user action, for example.

The parameter(s) may include a prescribed location for the detector. A clinician may have to arrange the patient and detector as prescribed to acquire the intended image(s). To facilitate such arrangement, fiducials may be useful in the localizer image (e.g. image from step 902), for example. The fiducials may provide geographical reference points in an imaging environment that assist the clinician in proper arrangement of the patient and/or detector, for example.

As an illustrative example, method 900 may be performed in the following manner using the system shown in FIG. 1. At step 902, an application running on computer 40 receives a lateral image of a patient's mid-section. A radiologist interacts with the application and directs the application to receive the image from the network storage device. The lateral image includes the volume of interest which to be imaged for clinical purposes. The lateral image was previously generated by CT scan and was stored on a network storage device. The image is a two-dimensional lateral slice including grayscale information corresponding to the patient's anatomy. The image allows the clinician to generally identify major structure in the patient, such as the spinal column, ribs, and lungs.

At step 904, the radiologist interacts with the application and the image to create a desired tomosynthesis imaging procedure. The application also displays a detector representation. The detector representation corresponds to the detector 30 in the system (e.g. size, thickness, etc.). With a mousing device, the radiologist is able to move the detector representation position with respect to the image. The radiologist moves the detector representation to correspond to a desired volume of interest of the patient. Correspondingly, the thickness guides move relative to the position of the detector representation. The radiologist then positions the thickness guides to correspond to the desired volume of interest. The radiologist cannot move the thickness guides beyond the available thickness range for the given system. Once the radiologist is satisfied, the radiologist then adds slice location guides. The radiologist specifies the number of slices, the thickness of the slices, and the separation of the slices. The radiologist uses a mousing device in conjunction with the application and various menus to set up the slice location guides. The radiologist is not permitted to exceed the limitations of the particular system. The radiologist indicates through the application that he is satisfied with the arrangement of the detector, thickness guides, and slice location guides.

At step 906, the application generates parameters in accordance with the arrangement from step 904. The parameters relate to the position of tube 20, angulation of tube 20, intensity of x-rays 22, timing of x-rays 22, and sensitivity map of detector 30. Each of these parameters is a function over time. The parameters are within the capabilities of the system. If they are outside of the permissible ranges, the application could adjust the parameters to correspond to be within the permissible ranges of the system.

At step 908, tomosynthesis is performed in accordance with the parameters generated at step 906. Some of the parameters involve the arrangement of the patient's volume of interest 21 with respect to the detector 30. The radiologist oversees this arrangement, to ensure that actual imaging will be substantially similar to the arrangement of elements performed at interactive step 904. The remainder of the parameters are automatically accounted for during the image acquisition, pre-processing, reconstruction, post-processing, display and visualization, computer-aided diagnosis, and/or archiving steps (e.g. those shown in method 100 of FIG. 2).

In an embodiment, a computer and/or processor (e.g. computer 40 shown in FIG. 1) includes or is in communication with a computer-readable medium, such as a hard disk, floppy disk, CD, CD-ROM, DVD, compact storage, flash memory and/or other memory. The medium may be in computer 40 and/or in a separate system, for example. The medium may include a set of instructions capable of execution by a computer or other processor, for example. The functions described above may be implemented as instructions on the computer-readable medium, for example. For example, the set of instructions may include a reception routine that receives an image, such as a lateral image, for example. Additionally, the set of instructions may include an interaction routine that allows either automatic and/or user interaction with respect to the image, for example. For example, the interaction routine may allow the arrangement of a detector representation, thickness guide(s), and/or slice location guide(s) with respect to the image. Additionally, the set of instructions may include a prescription routine that prescribes one or more parameters based on the arrangement of the image with respect to the detector, thickness guide(s), and/or slice location guide(s), for example. Additionally, the set of instructions may include a tomosynthesis routine for performing tomosynthesis in accordance with the one or more parameters.

Thus, embodiments of the present application provide methods and systems that are capable of addressing, overcoming, or reducing the impact of more than a narrow subset of the problems that may arise as a result of using the standard digital radiography image acquisition, processing, and display chain for tomosynthesis. Additionally, embodiments of the present application provide for methods and systems that capitalize on any one or more of the potential opportunities presented by digital tomosynthesis. Moreover, embodiments of the present application provide methods and systems that have any one or more of these or other advantageous features.

While the invention has been described with reference to certain embodiments, it will be understood by those skilled in the art that various changes may be made and equivalents may be substituted without departing from the scope of the invention. In addition, many modifications may be made to adapt a particular situation or material to the teachings of the invention without departing from its scope. For example, features may be implemented with software, hardware, or a mix thereof. Therefore, it is intended that the invention not be limited to the particular embodiment disclosed, but that the invention will include all embodiments falling within the scope of the appended claims.

The invention claimed is:

1. A method for performing tomosynthesis comprising:
receiving an image representative of an anatomy of a patient;
allowing a user to interact with the image to position at least one of a first element and a second element with respect to the image to form an arrangement;
providing visual feedback by displaying the arrangement to the user; and
prescribing at least one parameter for obtaining a tomosynthesis image based at least in part on the arrangement,
wherein the each of the first element and the second elements comprise a different one of a detector representation, a thickness guide, or a slice location guide.

2. The method of claim 1, further comprising a third element, wherein each of the first element, the second element, and the third element comprise a different one of a detector representation, a thickness guide, or a slice location guide.

3. The method of claim 1, further comprising automatically positioning one of the first element and the second element in response to a position of another of the first element and the second element.

4. The method of claim 1, wherein the step of allowing a user to interact with the image comprises allowing the user to interact to independently position each of the first element and the second element.

5. The method of claim 1, wherein the at least one parameter comprises at least one of a detector position, a detector size, a thickness size, a thickness position, a slice size, a slice position, a slice thickness, a slice separation, a field of view, a reconstruction algorithm, a banging protocol, or an image processing routine.

6. The method of claim 1, wherein the at least one parameter comprises at least one of an x-ray source location, an x-ray source angulation, an x-ray beam intensity, an x-ray beam gating, or a detector sensitivity.

7. The method of claim 1, wherein the feedback indicates an incompatibility when a position of the first element and a first position of the second element arrangement are incompatible.

8. The method of claim 1, wherein the step of allowing a user to interact with the image comprises allowing the user to interact to adjust at least one of a size of the detector representation or a type of the detector representation.

9. A system for performing tomosynthesis comprising:
a user interface configured to allow a user to interact with a processor; and
an application configured to run on the processor wherein the application is configured to receive an image representative of a patient;
wherein the user is capable of interacting with the application through the user interface to position at least one of a first element and a second element with respect to the image to form an arrangement and to generate at least one parameter for performing tomosynthesis,
wherein the first element and the second element each comprise a different one of a detector representation, a thickness guide, or a slice location guide,
and wherein the application is configured to provide visual feedback by displaying the arrangement to the user.

10. The system of claim 9, wherein the at least one parameter comprises at least one of a detector position, a detector size, a thickness size, a thickness position, a slice size, a slice position, a slice thickness, a slice separation, a field of view, a reconstruction algorithm, a hanging protocol, or an image processing routine.

11. The system of claim 9, wherein the at least one parameter comprises at least one of an x-ray source location, an x-ray source angulation, an x-ray beam intensity, an x-ray beam gating, or a detector sensitivity.

12. The system of claim 9, wherein the application is configured to allow the user to interact to position the first element, and is further configured to automatically position the second element based at least in part on a position of the first element.

13. The system of claim 9, wherein the application is configured to visually indicate to the user an incompatibility when a position of the first element and a position of the second element in the arrangement are incompatible.

14. A computer-readable storage medium including a set of instructions for execution on a computer, the set of instructions comprising:
a reception routine configured to receive an image representative of an anatomy of a patient;
an interaction routine configured to allow a user to interact with the image to position at least one of a first element and a second element with respect to said image to form an arrangement, wherein each of the first element and the second element comprise a different one of a detector representation, a thickness guide, or a slice location guide;
a feedback routine configured to provide visual feedback by displaying the arrangement to the user; and
a prescription routine configured to prescribe at least one parameter for obtaining a tomosynthesis image based at least in part on the arrangement.

15. The set of instructions of claim 14, further comprising a tomosynthesis routine for performing tomosynthesis in accordance with the at least one parameter.

16. The set of instructions of claim 14, wherein the at least one parameter comprises at least one of a detector position, a detector size, a thickness size, a thickness position, a slice size, a slice position, a slice thickness, a slice separation, a field of view, a reconstruction algorithm, a hanging protocol, or an image processing routine.

17. The set of instructions of claim 14, wherein the at least one parameter comprises at least one of an x-ray source location, an x-ray source angulation, an x-ray beam intensity, an x-ray beam gating, or a detector sensitivity.

* * * * *